[United States Patent Office — 3,179,634 — Patented Apr. 20, 1965]

3,179,634
AROMATIC POLYIMIDES AND THE PROCESS FOR PREPARING THEM

Walter Murray Edwards, Wilmington, Del., assignor to E. I. du Pont de Nemours and Company, Wilmington, Del., a corporation of Delaware
No Drawing. Filed Jan. 26, 1962, Ser. No. 169,120
24 Claims. (Cl. 260—78)

This invention relates to novel polymeric materials and has as its primary object the preparation of a novel group of polyimides. Other objects will appear hereinafter.

This application is a continuation-in-part of my copending application Serial No. 803,347, filed April 1, 1959, now abandoned.

The novel group of polyimides is characterized by a recurring unit having the following structural formula:

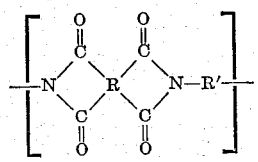

wherein R is a tetravalent aromatic radical, preferably containing at least one ring of six carbon atoms, said ring characterized by benzenoid unsaturation, the four carbonyl groups being attached directly to separate carbon atoms in a ring and each pair of carbonyl groups being attached to adjacent carbon atoms in a ring of the R radical; and wherein R' is a divalent benzenoid radical selected from the group consisting of

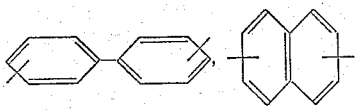

and

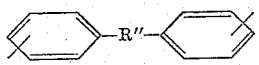

wherein R" is selected from the group consisting of an alkylene chain having 1–3 carbon atoms,

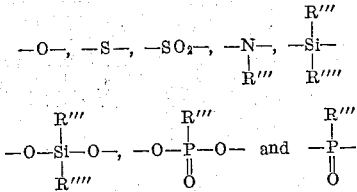

wherein R''' and R'''' are selected from the group consisting of alkyl and aryl.

The polyimides of the present invention display outstanding physical and chemical properties which make them very useful as shaped structures such as self-supporting films, fibers, filaments and the like. The structures are characterized by high tensile properties, desirable electric properties and surprising stability to heat and water.

The polyimides are prepared by reacting at least one organic diamine having the structural formula $$H_2N—R'—NH_2$$

wherein R' is a divalent benzenoid radical selected from the group consisting of

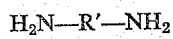

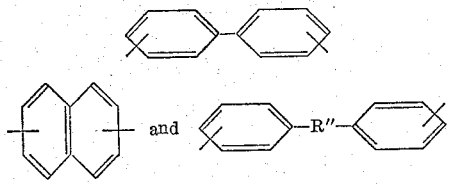

wherein R" is selected from the group consisting of an alkylene chain having 1–3 carbon atoms,

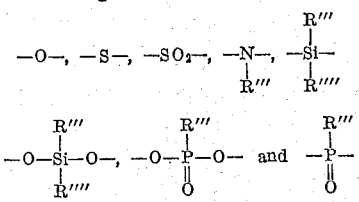

wherein R''' and R'''' are selected from the group consisting of alkyl and aryl, with at least one tetracarboxylic acid dianhydride having the structural formula:

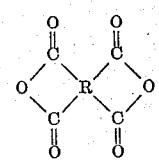

wherein R is a tetravalent aromatic organic radical, preferably containing at least one ring of six carbon atoms, said ring characterized by benzenoid unsaturation, the four carbonyl groups being attached directly to separate carbon atoms in a ring and carbon atoms of each pair of carbonyl groups being attached to adjacent carbon atoms in a ring of the radical.

The diamine and the dianhydride may be reacted directly. Alternatively, the dianhydride may first be reacted with a mono-functional alcohol (ethanol) to form a monomeric diester-diacid which is then reacted with the diamine. As a third alternative, any combination of the foregoing two techniques may be used. In all of these techniques melt polymerization is performed under such conditions to form the polyimide directly.

However, the preferred process is described in my copending application Serial No. 95,014, filed March 13, 1961. This process involves first preparing a polyamide-acid having an inherent viscosity of at least 0.1, preferably 0.3–5, by the reaction of the diamine and the dianhydride in an organic solvent for at least one of the reactants, the solvent being inert to the reactants, preferably under substantially anhydrous conditions for a time and at a temperature below 175° C., sufficient to provide in most instances at least 50% of the corresponding polyamide-acid, and then converting the polyamide-acid to the polyimide, the polyimide also having an inherent viscosity of at least 0.1, preferably 0.3–5.

The inherent viscosity of the polyimide is measured at 30° C. as a 0.5% solution in a suitable solvent for the polyimide. For many polyimides of this invention, concentrated (96%) sulfuric acid is a suitable solvent. However, the solvent may be selected from a group consisting of concentrated sulfuric acid, fuming nitric acid, the monohydrate of sym-dichlorotetrafluoroacetone and the hydrate of monochloropentafluoroacetone. It has been found that if the polyimide is not soluble in concentrated sulfuric acid to the extent of 0.5%, then its inherent viscosity in a suitable solvent can usually be considered to be greater than 0.1. For example, poly bis (4 aminophenyl) ether pyromellitimide prepared by this invention may not be soluble to the extent of 0.5% in concentrated sulfuric acid, yet it displays an inherent viscosity greater than 0.1 when measured as a 0.5% solution in the monohydrate of sym-dichloroetetrafluoroacetone or in fuming nitric acid.

It is also preferred to form a shaped structure of the polyamide-acid composition prior to converting the polyamide-acid to the polyimide. In any event, the conversion of the polyamide-acid to the polyimide may be accomplished by a heat treatment or any of the chemical treatments or combinations of treatments as described hereinafter.

It should be understood that one purpose of the preferred process is to provide a composition containing enough polyamide-acid so that it can be shaped into useful objects prior to conversion of polyamide-acid to polyimide. For this purpose, it has been found that a composition containing a polymeric component made up of at least 50% of the polyamide-acid will suffice for most combinations of diamine/dianhydride reaction products. However, for polyamide-acids prepared from some combinations of diamine and dianhydride, the polymeric components of shapeable compositions may contain less than or may have to contain more than 50% of the polyamide-acid. It should also be understood that the polymers may be modified with inert materials prior to or subsequent to shaping. These modifying agents may be selected from a variety of types such as pigments, dyes, inorganic and organic fillers, etc.

Furthermore, in determining a specific time and a specific temperature for forming the polyamide-acid of a specified diamine and a specified dianhydride, several factors must be considered. The maximum permissible temperature will depend on the diamine used, the dianhydride used, the particular solvent, the percentage of polyamide-acid desired in the final composition and the minimum period of time that one desires for the reaction. For most combinations of diamines and dianhydrides falling within the definitions given above, it is possible to form compositions of 100% polyamide-acid by conducting the reaction below 100° C. However, temperatures up to 175° C. may be tolerated to provide shapable compositions. The particular temperature below 175° C. that must not be exceeded for any particular combination of diamine, dianhydride, solvent and reaction time to provide a reaction product composed of sufficient polyamide-acid to be shapeable will vary but can be determined by a simple test by any person of ordinary skill in the art. However, to obtain the maximum inherent viscosity, i.e., maximum degree of polymerization, for any particular combination of diamine, dianhydride, solvent, etc., and thus produce shaped articles such as films and filaments of optimum toughness, it has been found that the temperature throughout the reaction should be maintained below 60° C., preferably below 50° C.

The details of a preferred process involve premixing equimolar amounts of the diamine and the dianhydride as dry solids and then adding the mixture, in small proportions and with agitation, to the organic solvent. Premixing the ingredients and then adding them in small proportions to the solvent provides relatively simple means for controlling the temperature and the rate of the process. Since the reaction is exothermic and tends to accelerate very rapidly, it is important to regulate the additions to maintain the reaction temperature at the desired level. However, the order of addition may be varied. After premixing the diamine and the dianhydried, the solvent may be added to the mixture with agitation. It is also possible to dissolve the diamine in the solvent while agitating, preheat the solution and then add the dianhydride at a sufficiently slow rate to control of the polymer in a suitable solvent, e.g. N,N-dimethylacetamide. To calculate inherent viscosity, the viscosity of the polymer solution is measured relative to that of the solvent alone.

Inherent viscosity=

$$\frac{\text{natural logarithm } \frac{\text{Viscosity of solution}}{\text{Viscosity of solvent}}}{C}$$

where C is the concentration expressed in grams of polymer per 100 milliliters of solution. As known in the polymer art, inherent viscosity is directly related to the molecular weight of the polymer.

The quantity of organic solvent used in the preferred process need only be sufficient to dissolve enough of one reactant, preferably the diamine, to initiate the reaction of the diamine and the dianhydride. For forming the composition into shaped articles, it has been found that the most successful results are obtained when the solvent represents at least 60% of the final polymeric solution. That is, the solution should contain 0.05–40% of the polymeric component. The viscous solution of the polymeric composition containing at least 50% polyamide-acid in the polymeric component dissolved in the solvent may be used as such for forming shaped structures.

The shaped articles composed of a substantial amount of the polyamide-acid, usually at least 50% of the polyamide-acid, are then converted to the respective polyimide shaped articles. It should be understood that the conversion processes to be described also apply to compositions containing the reaction temperature. Ordinarily, in this latter process the last portion of the dianhydride is added with part of the organic solvent. Another possible method involves adding the reactants to the solvent in small proportions, not as a pre-mixture, but alternately; first diamine, then dianhydride, then diamine, etc. In any event, it is advisable to agitate the solution polymerization system after the additions are completed until maximum viscosity denoting maximum polymerization is obtained. Still another process involves dissolving the diamine in one portion of a solvent and the dianhydride in another portion of the same or another solvent and then mixing the two solutions.

The degree of polymerization of the polyamide-acid is subject to deliberate control. The use of equal molar amounts of the reactants under the prescribed conditions provides polyamide-acids of very high molecular weight. The use of either reactant in large excess limits the extent of polymerization. Besides using an excess of one reactant to limit the molecular weight of the polyamide-acid, a chain terminating agent such as phthalic anhydride may be used to "cap" the ends of the polymer chains.

In the preparation of the polyamide-acid intermediate, it is essential that the molecular weight be such that the inherent viscosity of the polymer is at least 0.1, preferably 0.3–5.0. The inherent viscosity of the polyamide-acid is measured at 30° C. at a concentration of 0.5% by weight at least 50% of the salt derivatives of polyamide-acids, e.g., the triethyl ammonium salt of the polyamide-acids, instead of the polyamide-acids themselves.

It should also be understood that instead of shaping the polyamide-acid composition into the usual articles, the polyamide-acid composition in the solvent may be used as a liquid coating composition. Such coating compositions may be pigmented with such compounds as titanium dioxide in amounts of 5–200% by weight. These coating compositions may be applied to a variety of substrates, for example, metals, e.g., copper, brass, aluminum, steel, etc., the metals in the form of sheets, fibers, wires, screening, etc.; glass in the form of sheets, fibers, foams, fabrics, etc.; polymeric materials, e.g. cellulosic materials such as cellophane, wood, paper, etc., polyolefins such as polyethylene, polypropylene, polystyrene, etc., polyesters such as polyethylene terephthalate, etc., perfluorocarbon polymers such as polytetrafluoroethylene, copolymers of tetrafluoroethylene with hexafluoropropylene, etc., polyurethanes, all polymeric materials in the form of sheets, fibers, foams, woven and non-woven fabrics, screening, etc.; leather sheets; etc. The polyamide-acid coatings are then converted to polyimide coatings by one or more of the processes to be described.

One process comprises converting the polyamide-acids having recurring units of the following structural formula:

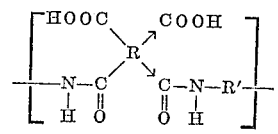

wherein → denotes isomerism, to polyimides by heating above 50° C. Heating serves to convert pairs of amide and carboxylic acid groups to imide groups. Heating may be conducted for a period of a few seconds to several hours. It has been found that after the polyamide-acid has been converted to the polyimide in accordance with the above described heat conversion, if the polyimide is further heated to a temperature of 300°–500° C. for a short interval (15 seconds to 2 minutes), improvements in the thermal and hydrolytic stabilities of the polyimide are obtained as well as an increase in inherent viscosity.

A second process for converting the polyamide-acid composition to the polyimide thereof is a chemical treatment and involves treating the polyamide-acid composition with a dehydrating agent alone or in combination with a tertiary amine, e.g., acetic anhydride or an acetic anhydride-pyridine mixture. The polyamide-acid shape article can be treated in a bath containing the acetic anhydride-pyridine mixture. The ratio of acetic anhydride to pyridine may vary from just above zero to infinite mixtures. It is believed that the pyridine functions as a catalyst for the action of the cyclyzing agent, the acetic anhydride. Other possible dehydrating agents for use include propionic anhydride, butyric anhydride and similar fatty-acid anhydrides. Other tertiary amine catalysts include triethylamine, isoquinoline, $\alpha$, $\beta$ or gamma-picoline, 2,5-lutidine, etc.

A third process for conversion involves treatment with a carbodiimide, e.g., dicyclohexylcarbodiimide. The carbodiimide also serves to dehydrate the polyamide-acid and to act as an effective cyclyzing agent.

As a fourth process of conversion, a combination treatment may be used. The polyamide-acid may be partially converted to the polyimide in a chemical conversion treatment and then cyclization to the polyimide may be completed by subsequent heat treatment. The conversion of the polyamide-acid to the polyimide in the first step should not exceed 50% if it is desired to shape the composition into suitable forms. After shaping, the completion of the cyclization of the polyimide/polyamide-acid may be accomplished.

The presence of polyimides is evidenced by their insolubility in cold basic reagents as opposed to the rapid solubility of the polyamide-acid. Their presence is also apparent if the polyamide-acids are scanned with infrared during conversion to the polyimide. The spectra initially show a predominating absorption band at ca. 3.1 microns due to the NH bond. This band gradually disappears and as the reaction progresses, the polyimide absorption bands appear, a doublet at ca. 5.64 and 5.89 microns and a peak at 13.85 microns. When conversion is completed, the characteristic polyimide band predominates. In some cases, one can also detect minor amounts of isoimide linkages, i.e.

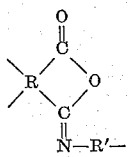

The starting materials for forming the products of the present invention are specific organic diamines and tetracarboxylic acid dianhydrides. The organic diamines are characterized by the formula $H_2NR'—NH_2$ wherein R' is a divalent benzenoid radical selected from the group consisting of

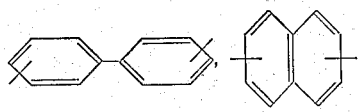

and

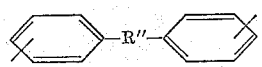

wherein R'' is a divalent isoelectronic configuration comprising elements from Rows IVa, Va and VIa of the Periodic Table having an atomic weight of 12–33. Among the diamines which are suitable for use in the present invention are: 4,4'-diaminodiphenyl propane, 4,4'-diamino-diphenyl methane, benzidine, 3,3'-dichlorobenzidine, 4,4'-diamino-diphenyl sulfide, 3,3'-diamino-diphenyl sulfone, 4,4'-diamino-diphenyl sulfone, 4,4'-diamino-diphenyl ether, 1,5-diamino naphthalene, 4,4'-diamino-diphenyl diethylsilane, 4,4'-diamino-diphenyl diphenylsilane, 4,4'-diamino-diphenyl ethyl phosphine oxide, 4,4'-diamino-diphenyl phenyl phosphine oxide, 4,4'-diamino-diphenyl N-methyl amine, 4,4'-diamino-diphenyl N-phenyl amine and mixtures thereof.

The tetracarboxylic acid dianhydrides are characterized by the following formula:

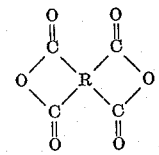

wherein R is a tetravalent organic radical containing at least 6 carbon atoms characterized by benzenoid unsaturation, wherein the 4 carbonyl groups of the dianhydride are each attached to separate carbon atoms and wherein each pair of carbonyl groups is directly attached to adjacent carbon atoms in the R group to provide a 5-membered ring as follows:

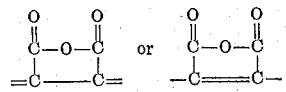

Illustrations of dianhydrides suitable for use in the present invention include: pyromellitic dianhydride, 2,3,6,7-naphthalene tetracarboxylic dianhydride, 3,3',4,4'-diphenyl tetracarboxylic dianhydride, 1,2,5,6-naphthalene tetracarboxylic dianhydride, 2,2',3,3'-diphenyl tetracarboxylic dianhydride, 2,2-bis(3,4-dicarboxyphenyl) propane dianhydride, bis(3,4-dicarboxyphenyl) sulfone dianhydride, perylene 3,4,9,10-tetracarboxylic acid dianhydride, bis(3,4-dicarboxyphenyl) ether dianhydride, naphthalene-1,2,4,5-tetracarboxylic dianhydride, 2,2-bis(2,3-dicarboxyphenyl) propane dianhydride, 1,1-bis(2,3-dicarboxyphenyl) ethane dianhydride, 1,1-bis(3,4-dicarboxyphenyl) ethane dianhydride, bis(2,3-dicarboxyphenyl) methane dianhydride, bis(3,4-dicarboxyphenyl) methane dianhydride, benzene-1,2,3,4-tetracarboxylic dianhydride, pyrazine-2,3,5,6-tetracarboxylic dianhydride, thiophene-2,3,4,5-tetracarboxylic dianhydride, 3,4,3',4'-benzophenone tetracarboxylic dianhydride etc.

The solvents useful in the solution polymerization process for synethesizing the intermediate polyamide-acid compositions in the preferred process of preparing the polyimides are the organic solvents whose functional groups do not react with either of the reactants (the diamines or the dianhydrides) to any appreciable extent. Besides being inert to the system and, preferably, being a solvent for the product, the organic solvent must be a solvent for at least one of the reactants, preferably for both of the reactants. To state it another way, the organic solvent is an organic liquid other than either reactant or homologs of the reactants that is a solvent for at least 1 reactant, and contains functional groups, the functional groups being groups other than monofunctional primary and secondary amino groups and other than the monofunctional dicarboxylanhydro groups. The normally liquid organic solvents of the N,N-dialkylcarboxyamide class are useful as solvents in the process of this invention. The preferred solvents are the lower molecular weight members of this class, particularly N,N-dimethylformamide and N,N-dimethylacetamide. They may easily be removed from the polyamide-acid and/or polyamide-acid shaped articles by evaporation, displacement or diffusion. Other typical compounds of this useful class of solvents are: N,N-diethylformamide, N,N-diethylacetamide, N,N-dimethylmethoxy acetamide, N-methyl caprolactam, etc. Other solvents which may be used in the present invention are: dimethylsulfoxide, N-methyl-2-pyrrolidone, tetramethylene urea, pyridine, dimethylsulfone, hexamethylphosphoramide, tetramethylene sulfone, formamide, N-methylformamide, butyrolactone and N-acetyl-2-pyrrolidone. The solvents can be used alone, in combinations of solvents, or in combination with poor solvents such as benzene, benzonitrile, dioxane, xylene, toluene and cyclohexane.

The invention will be more clearly understood by referring to the examples which follow. These examples, which illustrate specific embodiments of the present invention, should not be construed to limit the invention in any way.

For convenience, abbreviations will be used wherever possible. Thus, DDP represents 4,4'-diamino-diphenyl propane; DDM, 4,4'-diamino-diphenyl methane; PP, benzidine; POP, 4,4'-diamino-diphenyl ether; PSP, 4,4'-diamino-diphenyl sulfide; $PSO_2P$, 4,4'-diamino-diphenyl sulfone; APDS, 4,4'-diamino-diphenyl diethylsilane; APPO, 4,4'-diamino-diphenyl phenyl-phosphine oxide; APMA, 4,4'-diamino-diphenyl N-methylamine; APP, 4,4'-diamino-diphenyl phenyl phosphonate; APDSO, 4,4'-diamino-diphenyl diethylsiloxane; PMDA, pyromellitic dianhydride; PPDA, 2,2-bis(3,4-dicarboxyphenyl) propane dianhydride; PEDA, bis(3,4-dicarboxyphenyl) ether dianhydride; $PSO_2DA$, bis(3,4-dicarboxyphenyl) sulfone dianhydride; DMF, N,N-dimethylformamide; DMA, N,N-dimthylacetamide; MP, N-methyl-2-pyrrolidone; T, toluene; P, pyridine; and AA, acetic anhydride.

The examples are summarized in Table I. The details of the examples, where some of the compositions are shaped into useful structures such as films and filaments, follow the table.

The preparations of some of the important ingredients used in the examples are given below:

The pyromellitic dianhydride used was obtained as white crystals by sublimation of the comercial product through silica gel at 220–240° C. and 0.25–1 mm. mercury pressure.

N,N-dimethylformamide and N,N-dimethylacetamide were prepared by fractional distillation from phosphorous pentoxide; the fraction distilling at 47.5° C. and 17 mm. pressure being N,N-imethylformamide and the fraction distilling at 73° C. and 30 mm. pressure being N,N-dimethylacetamide.

TABLE I

*Summary of examples*

| Example | Gms. reactants | | Mls. solvent | Conversion |
|---|---|---|---|---|
| | Diamine | Dianhydride | | |
| 1 | 20.0 DDM | 22.0 PMDA | 200 DMF | Heat. |
| 2 | 10.35 DDP | 10.0 PMDA | 60 DMF/P(1/1) | Do. |
| 3 | 3.0 DDM | 3.3 PMDA | 50 DMF | Do. |
| 4 | 9.15 POP | 10.0 PMDA | 100 DMF/P(3/2) | Do. |
| 5 | 9.38 PSP | 10.0 PMDA | 130 DMF/P(1/1) | Do. |
| 6 | {5.17 DDP / 4.22 PP} | 10.1 PMDA | 75 DMF/P(3/2) | Do. |
| 7 [1] | 10.35 DDP | 10.0 PMDA | 50 DMF | Do. |
| 8 [1] | 3.0 DDM | 3.3 PMDA | 50 DMF | Do. |
| 9 | 10.35 DDP | 10.0 PMDA | 56 DMF | (2). |
| 10 | 11.2 $PSO_2P$ | 10.0 PMDA | 75 DMF/P(2/1) | (2). |
| 11 | 2.01 PP | 2.37 PMDA | 50 DMF | P/AA. |
| 12 | {5.17 DDP / 4.22 PP} | 10.1 PMDA | 75 DMF/P(3/2) | P/AA. |
| 13 | 11.2 $PSO_2P$ | 10.0 PMDA | 150 DMF | P/AA. |
| 14 | 9.8 PSP | 10.0 PMDA | 180 DMF | P/AA. |
| 15 | 1.30 POP | 2.18 PPDA | 30 P | Heat. |
| 16 | 80.0 POP | 87.1 PMDA | 464 DMA | Do. |
| 17 | 12.0 POP | 13.0 PMDA | 191 DMA | Do. |
| 18 | 0.7 POP | 1.09 PEDA | 25 DMA | Do. |
| 19 | 4.0 POP | 4.34 PMDA | 75 DMA | Do. |
| 20 | 27.5 APDS | 22 PMDA | 200 DMF | Do. |
| 21 | 31.4 APPO | 22 PMDA | 200 DMF | Do. |
| 22 | 21.6 APMA | 22 PMDA | 200 DMF | Do. |
| 23 | 7.6 PSP | 12.5 $PSO_2DA$ | 200 DMF | Do. |
| 24 | 3.0 DDM | 3.3 PMDA | 50 DMF | Do. |
| 25–31 | POP | PMDA | DMA | P/AA. |
| 32–33 | POP | PMDA | DMA/MP/T | Heat. |
| 34 | APP | PMDA | DMF | Do. |
| 35 | APDSO | PMDA | DMF | Do. |

[1] In Examples 7–8, 50 mole percent of the acid groups in the polyamide-acid solution were converted to the triethylammonium salt.
[2] In Examples 9–10, stoichiometric amounts of acetic anhydride/pyridine were added to the polyamide-acid solutions to convert 80 mole percent of the polyamide-acid groups to the corresponding polyimide prior to final conversion by heating.

EXAMPLE 1

4,4'-diamino-diphenyl methane, 20.00 g. (0.101 mole) was dissolved in 150 ml. of dimethylformamide. 22.00 g. (0.101 mole) of pyromellitic dianhydride was added portionwise with agitation while the solution was externally cooled with circulating water at approximately 15° C. A viscous dope formed and was further diluted with 50 ml. of dimethylformamide to give a casting solution containing 18.1% by weight of the polyamide-acid. The inherent viscosity was 1.73 (0.5% solution in dimethylformamide).

Films were cast with a doctor knife having a 15-mil opening and dried at 120° for 15 minutes under dry nitrogen in a forced draft oven. The films were fixed over steel plates with magnets, additionally dried for 15 minutes at 120° under nitrogen, and then heated to 300° C. in a hot vacuum oven to convert the polyamide-acid to the polyimide. The polyimide films displayed the following properties:

Inherent viscosity: 0.9 (0.5% solution in sulfuric acid)
Density: 1.362
Initial modulus:
    At 23° C.—350,000 p.s.i.
    At 200° C.—180,000 p.s.i.
Elongation:
    At 23° C.—14%
    At 200° C.—22%
Tensile strength:
    At 23° C.—11,900 p.s.i.
    At 200° C.—7,100 p.s.i.
Impact strength: 2.01 kg. cm./mil
Tear strength: 4.9 g./2 in. tear/mil
Retention of degree of toughness: 13,600

Hydrolytic stability:
    Greater than 100 hours in boiling water
    24 hours in steam
Thermal stability:
    Greater than 90 hours at 250° C. in air
    Greater than 24 hours at 310° C. in air
Zero strength temperature: 785° C.
Electrical properties:
    Volume resistivity (ohm.-cm.)—At 23° C.—greater than $2.5 \times 10^{15}$
    At 250° C.—greater than $4.1 \times 10^{11}$
    Dielectric constant (K)
    Dissipation factor ($D_f$)

| Temp., °C. | f | K | $D_f$ |
|---|---|---|---|
| 23 | $10^2$ | 3.96 | 0.0044 |
| 23 | $10^5$ | 3.86 | 0.0086 |
| 250 | $10^2$ | 3.19 | 0.0109 |
| 250 | $10^5$ | 3.17 | 0.0019 |

The tests are performed as follows:

Tensile strength, elongation and initial tensile modulus: These measurements are determined at 23° C. and 50% relative humidity. They are determined by elongating the film sample [1] at a rate of 100% per minute until the sample breaks. The force applied at the break in pounds/square inch (p.s.i.) is the tensile strength. The elongation is the percent increase in the length of the sample at breakage. Initial tensile modulus in p.s.i. is directly related to film stiffness. It is obtained from the slope of the stress-strain curve at the elongation of 1%; both tensile strength and initial tensile modulus are based upon the initial cross-sectional area of the sample.

Zero strength temperature: The zero strength temperature is that temperature at which a film supports a load of 20 lbs./square inch of film cross-sectional area for no more nor less than 5±0.5 seconds. The test is carried out by placing the sample in contact with a heated bar, the proper load being previously applied, and determining the length of time required for failure. This is carried out at various temperatures until the zero strength temperature is determined.

Degree of toughness is determined by subjecting a film 1 to 7 mils thick to a series of creasing actions by folding the film through 180° and creasing, followed by folding through 360° and creasing, to complete one cycle. The number of creasing cycles which the film withstands before breaking at the crease line is referred to herein at the "degree of toughness." If a film cannot be creased without breaking, it has a "degree of toughness of 0, and if the film breaks on the second cycle, its "degree of toughness" is 1, and so on. The "degree of toughness" for films of the present invention must be at least 3.

Retention of degree of toughness: This test is used for determining the effect of heat on the retention of toughness. It involves heating the polymer at 360° C. for 20 minutes under nitrogen, and determining loss of toughness caused by such heating. The retention of the "degree of toughness" must also be at least 3.

Impact strength or pneumatic impact strength is the energy required to rupture a film reported in kilogram-centimeters/mil of thickness of the film sample. It is determined by measuring the velocity of a ball ½" in diameter weighing 8.3 grams mechanically accelerated by air pressure, first in free flight and then in a flight impeded by rupturing a test film sample 1¾" x 1¾". The velocities are measured by timing photoelectrically the passage of the steel balls between two light beams set a definite distance apart. The pneumatic impact strength is measured by the loss in kinetic energy due to the rupturing of the film sample and is calculated by subtracting the square of velocity in impeded flight from the square of velocity in free flight and multiplying the result by the weight of the projectile divided by the acceleration due to gravity. This test is carried out at 23° C. and 50% relative humidity, and the test samples are conditioned for 24 hours at 23° C. and 50% relative humidity.

Tear strength is measured on an Elmendorf tear tester. A film is cut to form sample strips of 2.5" x 5.0" each. Ten such strips from each direction, i.e., ten having the longer dimension running in the machine or longitudial direction or the direction in which the film was extruded, cast or calendered, and ten having the longer dimension running in a direction transverse to the machine direction, are conditioned and tested at 75° F. and 35% relative humidity. The tester consists of a stationary jaw and a movable jaw mounted on a pendulum swinging on a substantially frictionless bearing equipped with a means for measuring the maximum arc through which the pendulum will swing. After the sample has been clamped in the tester, an initial cut of 0.81" running in the intended direction of the subsequent tear is made by means of a blade mounted on the tester. The force required to extend the initial tear is measured by determining the work done in tearing the film through a given distance which is 2.0". The work is determined from the difference in the swing of a pendulum, first free and then impeded by tearing the film. Auxiliary weights may be added to the pendulum when the tear strength of a single sheet of film exceeds the capacity of the pendulum alone. The scale of the Elmendorf tester, a standard instrument of the paper industry, reads in terms of grams/2.0" of tear/16 sheets. Since ten sheets are used in the present test, the values obtained from the tester must be corrected and are then converted to grams/2.0" of tear/mil of thickness.

Hydrolytic and thermal stabilities are evident from the foregoing description of the results.

The electrical properties are determined in accordance with known tests as described in U.S. Patent No. 2,787,603.

EXAMPLES 2-10

These examples were performed substantially as described for Example 1 using the ingredients shown in Table I. It should be noted that for Examples 7 and 8, 50 mole percent of the acid groups in the polyamide-acid solution was converted to the triethylammonium salt. The cast films were all converted to polyimide films by heating first at 120° C., then at 300° C. as described in Example 1. In Examples 9 and 10, a two-step conversion process was used as described in Table I.

The properties of the resulting polyimide films are given in Table II.

TABLE II

| Example | Tensile modulus | Elongation | Tensile strength | Retention of degree of toughness | Inherent viscosity |
|---|---|---|---|---|---|
| 2 | 370,000 | 7.4 | 11,900 | >3 | 0.5 |
| 3 | 340,000 | 12 | 12,500 | >3 | 0.6 |
| 4 | 350,000 | 10.4 | 13,000 | >3 | 0.8 |
| 5 | 320,000 | 7.3 | 10,000 | >3 | >0.3 |
| 6 | 500,000 | 4.2 | 10,900 | >3 | >0.3 |
| 7 | 330,000 | 5.8 | 9,400 | >3 | 0.8 |
| 8 | 370,000 | 11 | 11,100 | >3 | 1.4 |
| 9 | 300,000 | 6.2 | 10,050 | >3 | 0.5 |
| 10 | 350,000 | 14 | 8,500 | >3 | >0.3 |

EXAMPLES 11-14

The polyamide-acid solutions were prepared substantially as described for Example 1 using the ingredients shown in Table I. The solutions were cast into films with a doctor knife having a 15-mil opening. After drying for 15 minutes under dry nitrogen in a forced draft oven, the polyamide-acid films were stripped from the ---
[1] Samples were cut with a Thwing-Albert Cutter which cut samples ¼" wide.

glass plates and converted by chemical means to polyimide films.

In Example 11, the film was steeped in a 2/2/1 benzene/pyridine/acetic anhydride mixture for 20 hours to effect conversion to the polyimide. The film was then dried at 180° C. for two hours and then heated at 500° C. for one minute.

In Examples 12–14, the films were steeped in a 15/1/1 cyclohexane/pyridine/acetic anhydride mixture for 24 hours, then extracted in dioxane for one hour and then dried at 130° C. for one hour.

The properties of the resulting films are given in Table III.

TABLE III

| Example | Tensile modulus | Elongation | Tensile strength | Retention of degree of toughness |
| --- | --- | --- | --- | --- |
| 11 | 850,000 | 14 | 14,900 | >3 |
| 12 | 520,000 | 16.2 | 11,900 | >3 |
| 13 | 360,000 | 15 | 8,300 | >3 |
| 14 | 300,000 | 6.5 | 9,000 | >3 |

EXAMPLE 15

This example was performed substantially as described for Example 1 using the ingredients shown in Table I. It will be noted that 2.18 grams of 2,2-bis(3,4-dicarboxyphenyl) propane dianhydride were used.

A polyimide film was prepared as in Example 1. The film was tough, displaying properties similar to those shown in Table II and having a retention of degree of toughness greater than 3.

EXAMPLE 16

Bis(p-aminophenyl) ether, 80.0000 grams (0.3996 mole), and 87.1370 grams (0.3996 mole) of pyromellitic dianhydride were placed in a 2000-ml., three-necked flask. Four hundred and seventy-three grams of N,N-dimethylacetamide and 473 grams of toluene were added and the mixture was maintained under a nitrogen atmosphere as it was stirred for four hours. A very viscous solution resulted. 48.5 grams of this polyamide-acid solution was diluted with 23 grams of N,N-dimethylacetamide and 5.46 grams of rutile titanium dioxide was dispersed into this solution. The pigmented polyamide-acid was deposited over a copper subtrate and was converted to the insoluble polyimide via heat. The film was placed in an oven at 100° C. and the temperature was raised to 370° C. over a thirty-five minute period. The film exhibited satisfactory adhesion characteristics under such tests as sharp bend, convex and concave bump, and cellophane tape test.

EXAMPLE 17

Bis(p-aminophenyl) ether, 12.0000 grams (0.0550 mole), and 13.0200 grams (0.0550 mole) of pyromellitic dianhydride were placed in a 500-ml., three-necked flask. One hundred and eighty-three grams of N,N-dimethylacetamide was added and the mixture was maintained under a nitrogen atmosphere. The mixture was stirred for five hours and a viscous solution resulted. The polyamide-acid solution was diluted to 11% solids by the addition of 20 grams of N,N-dimethylacetamide. The inherent viscosity of the polyamide-acid by dilution to 0.5% solids in N,N-dimethylacetamide was 1.1.

This polyamide-acid solution (11% solids) was coated on 25 gauge copper wire by means of coating dies and this coated wire was passed vertically through an oven (four feet in height). The oven temperature ranged from 150° C. at the bottom to 370° C. at the top and the wire speed was 8–10 feet/minute. While passing through the oven, the polyamide-acid was thermally converted to the polyimide. Ten coats were applied to give a polyimide coating of 0.0018 to 0.0019 inch diameter increase. A flexible, non-brittle coating was obtained.

Characteristics [2] of this polyimide coated wire are as follows:

Dielectric strength _____ 3400 volts per mil.
Insulation resistance _____ Infinity.
Cut-through temperature _____ 485° C.
Dielectric constant (100 cycles) __ 3.78.
Dissipation factor (100 cycles) ___ 0.0029.

Resists common organic solvents (hexane, ethylacetate, acetone, xylene, N,N-dimethylacetamide, ethanol, chloroform) and dilute acids (5% hydrochloric and sulfuric acid), but the coating is attacked by 1% aqueous potassium hydroxide.

Accelerated tests for determining the life of the insulation at elevated temperatures carried out at several temperatures ranging from 220° C. to 280° C. and plotted on a time vs. temperature graph shows that this insulation is an excellent candidate for use in Class H electrical equipment when the resulting plotted line is extrapolated to the temperatures corresponinging to the respective classes of insulation as defined in A.I.E.E. Test No. 57.

EXAMPLE 18

To a mixture of 1.0894 g. (0.00351 mole) of bis(3,4-dicarboxyphenyl)ether dianhydride (M.P. 230–233° C.) and 0.7037 g. (0.00351 mole) of 4,4'-diaminodiphenyl ether, twenty-five milliliters of N,N-dimethylacetamide was added. Upon stirring, the monomers dissolved giving a colorless, slightly viscous solution having an inherent viscosity in 0.5%, N,N-dimethylacetamide of 0.74.

Thin polyamide-acid films were prepared by pouring portions of the polyamide-acid solution on a glass plate and allowing the solvent to evaporate under nitrogen stream. The polyamide-acid films were then heat-converted to the polyimide films in a glass tube heated by a split-tube furnace. The polyamide-acid films were slowly heated under a nitrogen stream to 325° C., the process requiring about five hours. The polyimide films thus obtained were transparent, slightly yellow, had a degree of toughness of over three, and possessed the following properties:

Stick temperature _____ About 305° C.
Tensile strength _____ 16,500 p.s.i.
Elongation _____ 22%.
Tensile modulus at room temperature __ 746,000 p.s.i.
Dielectric constant _____ 3.81.
Dissipation factor _____ 0.0012.

EXAMPLE 19

In a nitrogen atmosphere, 4.0000 grams (0.0199 mole) of 4,4'-diamino diphenyl ether and 4.3400 grams (0.0199 mole) of pyromellitic dianhydride were placed in a 250 milliliter flask equipped with mechanical stirrer. 47.2 grams of N,N-dimethylacetamide were added with stirring as the mixture was maintained under a nitrogen atmosphere. The reaction was conducted at room temperature (23° C.) and stirring was continued for three hours. 27.9 grams of N,N-dimethylacetamide were added to the viscous solution to give a 10% by weight polyamide-acid solution. The inherent viscosity of the polyamide-acid by dilution to 0.5% solids in N,N-dimethylacetamide was 1.1. Polyamide-acid films were cast on copper, aluminum, steel and glass panels with a doctor knife having a 10-mil opening. The films were dried at room temperature (23° C.) for 48 hours; the dried coating thickness was 0.5 mil. Adhesion of these films to the substrates was good.

Heating these coated substrates in a vacuum oven at 300° C. for 0.5 hour converts the polymer to polyimide which provides tough, transparent protective coatings.

---

[2] The methods for carrying out the characterization of the coated wire are described in Sanders, U.S. Patent No. 2,787,603, column 4, line 53 ff.

EXAMPLES 20–22

When the procedure of Example 1 is repeated using bis-(4-amino-phenyl) diethyl silane, phenyl bis-(4-aminophenyl) phosphine oxide, and bis-(4-amino-phenyl)-N-methylamine individually in molar amounts equal to the dianhydride, the corresponding polyamide-acid is obtained in each case. The inherent viscosity of each polyamide-acid is greater than 0.1 (as measured as a 0.5% solution in N,N-dimethylacetamide at 30° C.). Polyamide-acid films are made from these by casting onto glass plates and drying under vacuum at 50° C. instead of 80° C. By heating at 300° C. for 30 minutes, these films are converted to the corresponding polyimides which also have inherent viscosities greater than 0.1.

EXAMPLE 23

When the procedure of Example 1, wherein the diamine is first dissolved in N,N-dimethylformamide and the dianhydride is stirred portion-wise into the solution, is repeated using 0.035 mole of 4,4'-diamino-diphenyl sulfide and 0.035 mole of 3,4-dicarboxyphenyl sulfone dianhydride, the corresponding polyamide-acid is obtained. The inherent viscosity of the polyamide-acid is substantially above 0.1 (when measured as a 0.5% solution in N,N-dimethylacetamide at 30° C.).

The viscous solution is cast on glass plates and dried to form a tough, flexible polyamide-acid film, which is converted thermally to the corresponding polyimide by heating for 30 minutes at 300° C.

EXAMPLE 24

The surfaces of pieces of aluminum, brass, copper, cast iron, titanium and zinc (as galvanized coating on iron) were cleaned by rubbing lightly with emory cloth and rinsing with trichloroethylene. Then the surfaces were coated with a 12% solution of a polyamide-acid in N,N-dimethylformamide. The polyamide-acid had been made from 4,4'-diamino-diphenyl methane and pyromellitic dianhydride as in Example 8. The samples were dried in an air oven at 120° C. for 15 minutes producing coatings of polyamide-acid film which were 1 mil thick. These films adhered well to the metals, and were converted to the corresponding polyimide by baking in a vacuum oven at 300° C. for 0.5 hour.

Film adhesion was tested by scraping the surfaces. Adhesion to aluminum was excellent; to copper and brass it was good; and to the cast iron and zinc it was fair. The remarkable tenacity of the coating to the aluminum was shown by heating it to 300° C. and plunging it into cold water, whereby no decrease in adhesion occurred. No cracking was caused by creasing the sheet.

When this coating procedure was repeated on a fresh zinc sample of the type used before, but with a polyamide-acid coating of 0.2 mil, the final polyimide coating had good adhesion to the zinc.

EXAMPLE 25

Two solutions were sprayed simultaneously from two spray guns onto an untreated plywood panel. The first solution consisted of a 6% solids solution in N,N-dimethylacetamide of a polyamide-acid made from pyromellitic dianhydride and 4,4'-diamino-diphenyl ether using the method of Example 19. The second consisted of a mixture of 5 volumes of acetic anhydride, 3 volumes of pyridine and 2 volumes of triethylamine. After the desired thickness (about 5 mils) of polyamide-acid coating had been reached, the panel was dried in air for several days at room temperature, and then extracted by immersion in benzene and dried under vacuum at 50° C. for 1 hour. This produced an attractive polyimide finish resembling commercial wood finishes. A microflame, one inch high, placed one-half inch under the coated panel failed to ignite it even after 30 minutes, while an uncoated control sample caught fire in one minute under the same conditions.

EXAMPLE 26

By the procedure of Example 25 (the spray gun technique), the following substrates were coated with the polyamide-acid prepared by the method of Example 19: polyvinyl fluoride film, polyethylene terephthalate film, a polyurethane foam, polystyrene foam, polyvinyl chloride foam, glass wool, woven cotton fabric, metallized films of polyethylene terephthalate and of polyvinyl fluoride, stainless steel, iron and a sheet of polymethylmethacrylate. The ultimate polyimide coatings adhered well as in Example 25.

EXAMPLES 27–30

Films of oriented linear polyethylene, branched polyethylene, oriented linear polypropylene and a tetrafluoroethylene/hexafluoropropylene copolymer were first treated with an electrical discharge to improve surface adherability. They were then coated by solvent-casting a solution in N,N-dimethylacetamide of polyamide-acid having inherent viscosities of 2.0 and 1.0 which had been made from pyromellitic dianhydride and 4,4'-diamino-diphenyl ether. The polyamide-acid had been prepared using a procedure similar to that in Example 19. Films with 0.1, 0.5 and 1.0 mil coatings were prepared. Adhesion was good in all cases. The coatings were converted to polyimide coatings by treatment with acetic anhydride and pyridine, followed by solvent removal in a vacuum oven and 100° C.

Adhesion between these films and the polyimide coatings was excellent. The coated films resisted burning when a flame was applied to the polyimide surface, and a lighted cigarette was extinguished by pressing against the polyimide surfaces, without burning through the films.

EXAMPLE 31

Films of polyvinyl chloride, polyethylene terephthalate and cellophane, and non-woven mats of fibrous polyethylene and polypropylene were coated by dipping into the polyamide-acid solutions of the previous example. In every case adhesion and conversion of the polyamide-acid to polyimide by the use of the pyridine/acetic anhydride treatment were satisfactory.

EXAMPLE 32

Twenty twists of No. 18 copper wire were first annealed for 30 minutes at 150° C. and then dipped in a 14% solution of polyamide-acid, solution viscosity about 20 poises. The polyamide-acid has been prepared from pyromellitic dianhydride and 4,4'-diamino-diphenyl ether in N,N - dimethylacetamide/N - methyl - 2 - pyrrolidone/toluene using a procedure similar to that of Example 26. The wires were removed from the solution, allowed to drain and then baked 2 hours at 100° C. followed by 1 hour at 190° C. The dipping and baking procedure was repeated and then a final bake of 16 hours at 250° C. was given to provide wires coated with the corresponding polyimide.

EXAMPLE 33

A polyamide-acid of 4,4'-diamino-diphenyl ether and pyromellitic dianhydride was prepared substantially as in Example 26 using as the solvent a blend of N,N-dimethylacetamide/toluene/N - methyl - 2 - pyrrolidone — 1.75/1.75/1. The solution was adjusted to 13.5% solids. The viscosity of this solution was about 100–110 centipoises.

The coating was then applied by a dip technique to a 2-mil thick woven glass fabric. The coated material was drawn through an 8 foot drying tower with a temperature gradient of 100–170° C. After drying, the material was drawn vertically through the tower with the temperature gradient raised to 150–375° C. Three such coating and conversion cycles were necessary to produce the desired thickness of 3–3.5 mils of the fabric coated with the poly bis(4 aminophenyl) ether pyromellitimide.

This coated fabric had the following electrical properties:

Electric strength _____ 1230 volts/mil.
Dissipation factor (23.5° C.; 10³ c./s.) _____ 0.00153.
Dielectric constant (23.5° C.; 10³ c./s.) _____ 3.26.
Volume resistivity (23.5° C.) _____ 3.71×10¹⁴ ohm-cm.

A non-woven glass yarn is sized with the above coating solution, followed by drying and baking under the same conditions mentioned above. This is woven into a fabric having substantially the same properties as the impregnated woven fabric except that the interstices are not filled and the fabric is less stiff.

Similarly, a glass-served copper wire is coated with a tough, tightly-adhering polyimide layer.

EXAMPLES 34-35

When the procedure of Example 1 is repeated using bis-(4-amino-phenyl) diethyl siloxane and bis-(4-aminophenyl) phenyl phosphonate individually in molar amounts equal to the dianhydride, the corresponding polyamide-acid is obtained in each case. The inherent viscosity of each polyamide-acid is greater than 0.1 (as measured as a 0.5% solution in N,N-dimethylacetamide at 30° C.). Polyamide-acid films are made from these by casting onto glass plates and drying under vacuum at 50° C. instead of 80° C. By heating at 300° C. for 30 minutes, these films are converted to the corresponding polyimides which also have inherent viscosities greater than 0.1.

The polyimides of this invention find many applications in a wide variety of physical shapes and forms. Among the most significant of these forms are films and fibers. The useful combination of the desirable physical and chemical characteristics of this polymer is unique. Films and fibers of this polymer not only possess excellent physical properties at room temperature, but retain their strength and excellent response to work-loading at elevated temperatures for prolonged periods of time. Behavior of this type offers commercial utility in a wide range of end uses. The polyimide polymer of this invention is distinguished in having a combination of excellent resistance to corrosive atmospheres, an outstanding resistance to degradation by high energy particles and gamma ray radiation. This polymer resists melting upon exposure at 500° C. for extended periods while retaining hitherto unrealized high proportions of room temperature physical properties. Because of the unusual and surprising solubility of the polymer precursor in the preferred process of preparation, this polymer precursor may be processed into shaped articles such as films and fibers by conventional techniques and then converted in situ to the polyimide polymer of the invention.

Films formed from the polymer of this invention may be used wherever films have heretofore been used. They serve advantageously in an extensive variety of wrapping, packaging and bundling applications. Additionally, the polymer and film-forming polymer may be used in automobile and aviation interior head lining materials, in decorative trim, in high temperature electrical insulation for motor slot liners, motor phase insulation, in transformers, capacitors, coil and cable wrappings (form wound coil insulation for motors), for packaging items to be exposed to high temperature or high energy radiation while within the package, in corrosion-resistant pipe, pipe-lagging and duct work, for containers and container linings, and in laminating structures where the films are bonded to the sheet metal or foils. Laminating can be accomplished with epoxy resin adhesives.

The film can also serve as a printed circuit backing. Electric circuits can be made by coating the polyimide film with a thin layer of copper or aluminum, either by coating the metal with polyamide-acid and converting to polyimide, or by laminating to a polyimide film, or by vacuum metallization of the film. The circuit design is covered by a protective coating and the extra metal is etched off followed by washing to halt the etching. An outstanding advantage of such circuits is that the base film is so stable to heat that they can be connected to other components by a dip soldering technique while in contact with the other components.

The film also can serve as the outer, insulating layers of flat wire and cable assemblies, in which flat wires or metal strips are laminated between layers of polyimide film. Because of the excellent thermal stability of this polymer, such assemblies can be made by depositing strips of molten copper on a polyimide film, followed by the application of another layer of polyimide on the face carrying these strips. The laminated structure can then be slit longitudinally to produce strips of flat wire, each of which is insulated by being imbedded between two polyimide layers, except at the terminations. Such assemblies can be in multilayers, i.e., alternating layers of film and metal. Alternatively, the wire can be coated as described in the examples to have a polyimide coating. The coated wire can then be coated with a second type of polymeric coating, such as silicones, polyamides, polyesters, tetrafluoroethylene and its copolymers with hexafluoropropylene, polyvinyl acetals, e.g., polyvinyl butyral, and epoxy resins.

In fiber form, the polymer of the present invention offers possibilities for high temperature electrical insulation, protective clothing and curtains, filtration media, packing and bearing materials, brake linings and clutch facings.

In summary, the polymer has potentiality in a wide variety of applications. Some other possibilities include: as a finish for oven interiors, dryer liner, cooking utensil finish, muffler finish, liner for high temperature plant equipment, liner for hot water heaters, shatter-proof coating for glass in very thin films where high heat is involved (high wattage lamps, Pyrex baking dishes, etc.), as a low friction and high temperature lubricating film, as a flame-retardant paint, in heating elements made by incorporating either metallic conducting strips or conductive coatings of the "Chemelux" type, in belting for use in high temperature conveyors, as a liner for packaging of molten materials and as an underlay for flammable roofing.

What is claimed is:
1. A polyimide having the recurring unit:

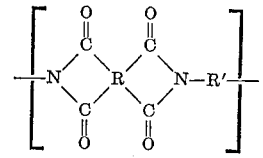

wherein R is a tetravalent radical containing at least one ring of six carbon atoms, said ring characterized by benzenoid unsaturation, the four carbonyl groups being attached directly to separate carbon atoms in a ring of the R radical and each pair of carbonyl groups being attached to adjacent carbon atoms in a ring of the R radical; and wherein R' is a divalent radical containing at least two rings of six carbon atoms, each ring characterized by benzenoid unsaturation, and in which no more than one of the valence bonds is located on any one of said rings of said R' radical.

2. A polyimide having the recurring unit:

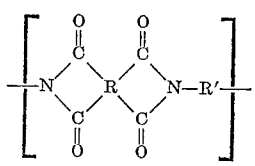

wherein R is a tetravalent radical containing at least one ring of six carbon atoms, said ring characterized by benzenoid unsaturation, the four carbonyl groups being attached directly to separate carbon atoms in a ring of the R radical and each pair of carbonyl groups being attached to adjacent carbon atoms in a ring of the R radical; and wherein R' is a divalent benzenoid radical selected from the group consisting of

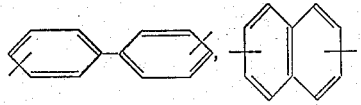

and

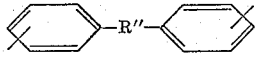

wherein R'' is selected from the group consisting of an alkylene chain having 1–3 carbon atoms,

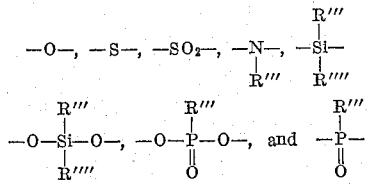

wherein R''' and R'''' are selected from the group consisting of alkyl and aryl.

3. A polyimide as in claim 2 having an inherent viscosity of at least 0.1 as measured at 30° C. as a 0.5% solution in sulfuric acid.

4. A polyimide of an aromatic tetracarboxylic acid dianhydride wherein all four carbonyl groups of said dianhydride are directly attached to an aromatic ring of said dianhydride and an aromatic diamine having the formula $$NH_2—R'—NH_2$$

wherein R' is a divalent benzenoid radical selected from the group consisting of

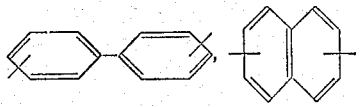

and

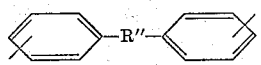

wherein R'' is selected from the group consisting of an alkylene chain having 1–3 carbon atoms,

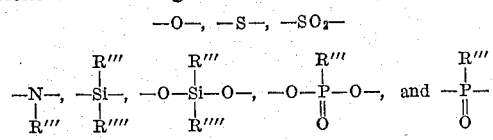

wherein R''' and R'''' are radicals having 1–6 carbon atoms selected from the group consisting of alkyl and aryl.

5. A polyimide of an aromatic tetracarboxylic acid dianhydride wherein all four carbonyl groups of said dianhydride are directly attached to an aromatic ring of said dianhydride and a diamine selected from the group consisting of benzidine, 4,4'-diamino diphenyl methane, 4,4'-diamino diphenyl ether, 4,4'-diamino diphenyl sulfone, and 4,4'-diamino diphenyl sulfide.

6. A polyimide of a dianhydride selected from the group consisting of pyromellitic dianhydride, 2,2-bis(3,4-dicarboxyphenyl) propane dianhydride, bis(3,4-dicarboxyphenyl) ether dianhydride, 3,4,3',4'-benzophenone tetracarboxylic dianhydride and bis(3,4-dicarboxyphenyl) sulfone dianhydride and a diamine selected from the group consisting of benzidine, 4,4'-diamino diphenyl propane, 4,4'-diamino diphenyl methane, 4,4'-diamino diphenyl ether, 4,4'-diamino diphenyl sulfone, and 4,4'-diamino diphenyl sulfide.

7. A filament consisting essentially of at least one polyimide of an aromatic tetracarboxylic acid dianhydride wherein all four carbonyl groups of said dianhydride are directly attached to an aromatic ring of said dianhydride and an aromatic diamine having the formula $$NH_2—R'—NH_2$$

wherein R' is a divalent benzenoid radical selected from the group consisting of

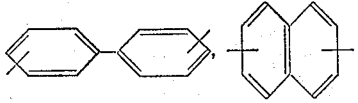

and

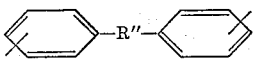

wherein R'' is selected from the group consisting of an alkylene chain having 1–3 carbon atoms,

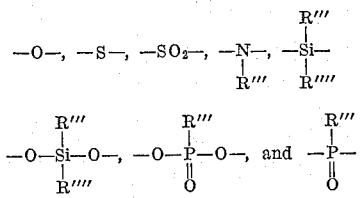

wherein R''' and R'''' are radicals having 1–6 carbon atoms selected from the group consisting of alkyl and aryl.

8. A self-supporting film consisting essentially of at least one polyimide of an aromatic tetracarboxylic acid dianhydride wherein all four carbonyl groups of said dianhydride are directly attached to an aromatic ring of said dianhydride and an aromatic diamine having the formula $$NH_2—R'—NH_2$$

wherein R' is a divalent benzenoid radical selected from the group consisting of

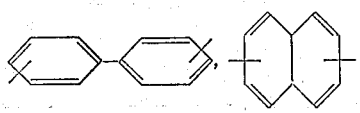

and

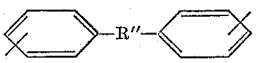

wherein R'' is selected from the group consisting of an alkylene chain having 1–3 carbon atoms,

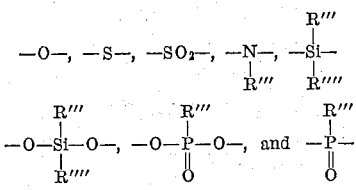

wherein R''' and R'''' are radicals having 1–6 carbon atoms selected from the group consisting of alkyl and aryl.

9. An electrically conductive metal wire coated with at least one polyimide of an aromatic tetracarboxylic acid dianhydride wherein all four carbonyl groups of said dianhydride are directly attached to an aromatic ring of said dianhydride and an aromatic diamine having the formula $$NH_2—R'—NH_2$$

wherein R' is a divalent benzenoid radical selected from the group consisting of

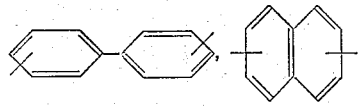

and

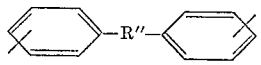

wherein R'' is selected from the group consisting of an alkylene chain having 1–3 carbon atoms,

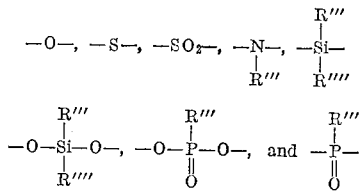

wherein R''' and R'''' are radicals having 1–6 carbon atoms selected from the group consisting of alkyl and aryl.

10. A copper sheet coated with at least one polyimide of an aromatic tetracarboxylic acid dianhydride wherein all four carbonyl groups of said dianhydride are directly attached to an aromatic ring of said dianhydride and an aromatic diamine having the formula $$NH_2-R'-NH_2$$

wherein R' is a divalent benzenoid radical selected from the group consisting of

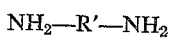

and

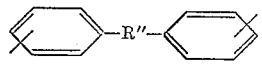

wherein R'' is selected from the group consisting of an alkylene chain having 1–3 carbon atoms,

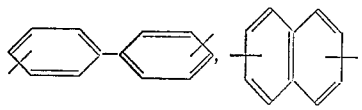

wherein R''' and R'''' are radicals having 1–6 carbon atoms selected from the group consisting of alkyl and aryl.

11. A fabric of a polymeric material different from polyimide coated with at least one polyimide of an aromatic tetracarboxylic acid dianhydride wherein all four carbonyl groups of said dianhydride are directly attached to an aromatic ring of said dianhydride and an aromatic diamine having the formula $$NH_2-R'-NH_2$$

wherein R' is a divalent benzenoid radical selected from the group consisting of

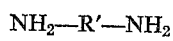

and

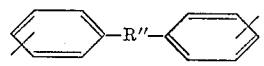

wherein R'' is selected from the group consisting of an alkylene chain having 1–3 carbon atoms,

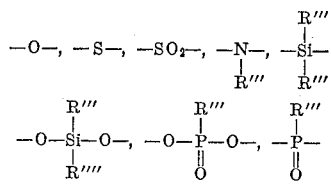

wherein R''' and R'''' are radicals having 1–6 carbon atoms selected from the group consisting of alkyl and aryl.

12. A coated film consisting essentially of a film of at least one polyimide of an aromatic tetracarboxylic acid dianhydride wherein all four carbonyl groups of said dianhydride are directly attached to an aromatic ring of said dianhydride and an aromatic diamine having the formula $$NH_2-R'-NH_2$$

wherein R' is a divalent benzenoid radical selected from the group consisting of

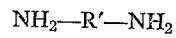

wherein R'' is selected from the group consisting of an alkylene chain having 1–3 carbon atoms,

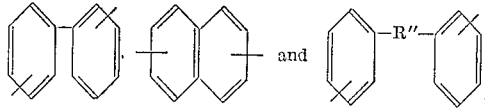

wherein R''' and R'''' are radicals having 1–6 carbon atoms selected from the group consisting of alkyl and aryl, having a metal coated thereon.

13. A coated film consisting essentially of a film of at least one polyimide of an aromatic tetracarboxylic acid dianhydride wherein all four carbonyl groups of said dianhydride are directly attached to an aromatic ring of said dianhydride and an aromatic diamine having the formula $$NH_2-R'-NH_2$$

wherein R' is a divalent benzenoid radical selected from the group consisting of

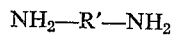

wherein R'' is selected from the group consisting of an alkylene chain having 1–3 carbon atoms,

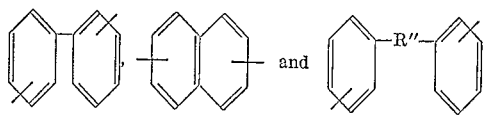

wherein R''' and R'''' are radicals having 1–6 carbon atoms selected from the group consisting of alkyl and aryl, having aluminum coated thereon.

14. A coated film consisting essentially of a film of at least one polyamide of an aromatic tetracarboxylic acid dianhydride wherein all four carbonyl groups of said dianhydride are directly attached to an aromatic ring of said dianhydride and an aromatic diamine having the formula $$NH_2-R'-NH_2$$

wherein R' is a divalent benzenoid radical selected from the group consisting of

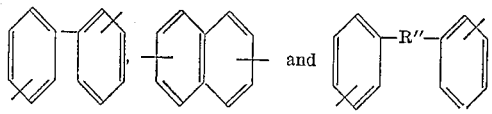

wherein R″ is selected from the group consisting of an alkylene chain having 1–3 carbon atoms,

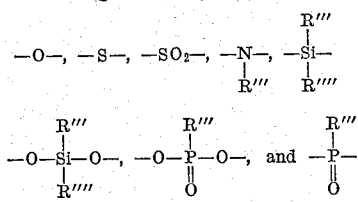

wherein R‴ and R″″ are radicals having 1–6 carbon atoms selected from the group consisting of alkyl and aryl, having copper coated thereon.

15. An aluminum sheet coated with at least one polyimide of an aromatic tetracarboxylic acid dianhydride wherein all four carbonyl groups of said dianhydride are directly attached to an aromatic ring of said dianhydride and an aromatic diamine having the formula $$NH_2\text{—}R'\text{—}NH_2$$

wherein R′ is a divalent benzenoid radical selected from the group consisting of

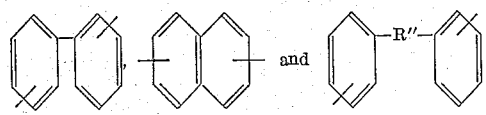

wherein R″ is selected from the group consisting of an alkylene chain having 1–3 carbon atoms,

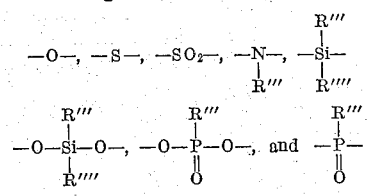

wherein R‴ and R″″ are radicals having 1–6 carbon atoms selected from the group consisting of alkyl and aryl.

16. A laminate composed of at least one layer of a polyimide film of an aromatic tetracarboxylic acid dianhydride wherein all four carbonyl groups of said dianhydride are directly attached to an aromatic ring of a film of said dianhydride and an aromatic diamine having the formula $$NH_2\text{—}R'\text{—}NH_2$$

wherein R′ is a divalent benzenoid radical selected from the group consisting of

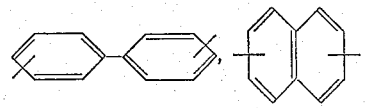

and

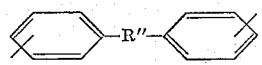

wherein R″ is selected from the group consisting of an alkylene chain having 1–3 carbon atoms,

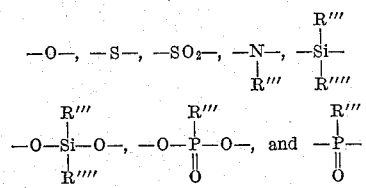

wherein R‴ and R″″ are radicals having 1–6 carbon atoms selected from the group consisting of alkyl and aryl and at least one layer of a film of a tetrafluoroethylene/hexafluoropropylene copolymer.

17. A laminate composed of at least one layer of a polyimide film of an aromatic tetracarboxylic acid dianhydride wherein all four carbonyl groups of said dianhydride are directly attached to an aromatic ring of said dianhydride and an aromatic diamine having the formula $$NH_2\text{—}R'\text{—}NH_2$$

wherein R′ is a divalent benzenoid radical selected from the group consisting of

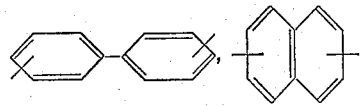

and

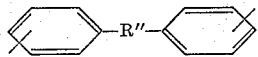

wherein R″ is selected from the group consisting of an alkylene chain having 1–3 carbon atoms,

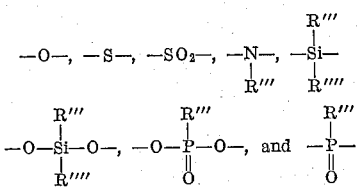

wherein R‴ and R″″ are radicals having 1–6 carbon atoms selected from the group consisting of alkyl and aryl and at least one layer of a film of a polyester.

18. Poly bis(4-aminophenyl) ether pyromellitimide.

19. A process for preparing polyimides which comprises reacting at least one diamine having the structural formula:

$$H_2N\text{—}R'\text{—}NH_2$$

wherein R′ is a divalent benzenoid radical selected from the group consisting of

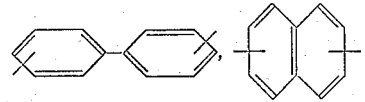

and

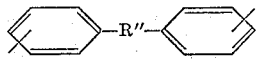

wherein R″ is selected from the group consisting of an alkylene chain having 1–3 carbon atoms,

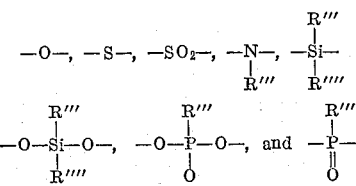

wherein R‴ and R″″ are radicals having 1–6 carbon atoms selected from the group consisting of alkyl and aryl, with at least one tetracarboxylic acid dianhydride having the structural formula:

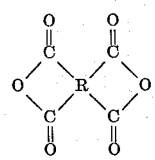

wherein R is a tetravalent aromatic radical, the four carbonyl groups being attached directly to separate carbon atoms and each pair of carbonyl groups being attached to adjacent carbon atoms in the R radical, in an organic solvent for at least one reactant for a time sufficient and at a temperature below 175° C. sufficient to form a polyamide intermediate soluble in said solvent; and subsequently heating said polyamide intermediate at a temperature above 50° C. for a time sufficient to form an insoluble solid polyimide.

20. A process as in claim 19 wherein the polyimide is heated to a temperature of 300° C.–500° C. for at least 15 seconds.

21. A process as in claim 19 wherein the polyamide intermediate is formed into a shaped structure prior to conversion into the polyimide.

22. A process as in claim 19 wherein the diamine is selected from the group consisting of benzidine, 4,4'-diamino diphenyl propane, 4,4'-diamino diphenyl methane, 4,4'-diamino diphenyl ether, 4,4'-diamino diphenyl sulfone, 4,4'-diamino diphenyl diethylsilane, 4,4'-diamino diphenyl phenylphosphine oxide, 4,4'-diamino diphenyl N-methylamine, 4,4'-diamino diphenyl sulfide, 4,4'-diamino-diphenyl phenyl phosphonate and 4,4'-diamino diphenyl diethylsiloxane.

23. A process as in claim 19 wherein the dianhydride is selected from the group consisting of pyromellitic dianhydride, 2,2-bis(3,4-dicarboxyphenyl) propane dianhydride, bis(3,4-dicarboxyphenyl) sulfone dianhydride and bis(3,4-dicarboxyphenyl) ether dianhydride.

24. A process for preparing polyimides which comprises reacting at least one diamine having the structural formula:

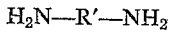

wherein R' is a divalent radical containing at least two rings of six carbon atoms, each ring characterized by benzenoid unsaturation, and in which no more than one of the valence bonds is located on any one of said rings of said R' radical, with at least one tetracarboxylic acid dianhydride having the structural formula:

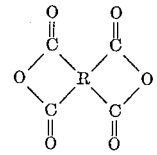

wherein R is a tetravalent aromatic radical, the four carbonyl groups being attached directly to separate carbon atoms and each pair of carbonyl groups being attached to adjacent carbon atoms in the R radical, in an organic solvent for at least one reactant for a time sufficient and at a temperature below 175° C. sufficient to form a polyamide intermediate soluble in said solvent; and subsequently heating said polyamide intermediate at a temperature above 50° C. for a time sufficient to form an insoluble solid polyimide.

References Cited by the Examiner
UNITED STATES PATENTS

| | | | |
|---|---|---|---|
| 2,071,250 | 2/37 | Carothers | 260—78 |
| 2,710,853 | 6/55 | Edwards et al. | 260—78 |
| 2,712,543 | 7/55 | Gresham et al. | 260—78 |
| 2,731,447 | 1/56 | Gresham et al. | 260—78 |
| 2,880,230 | 3/59 | Edwards et al. | 260—78 |
| 2,900,369 | 8/59 | Edwards et al. | 260—78 |
| 3,037,966 | 6/62 | Chow et al. | 260—78 |
| 3,073,784 | 1/63 | Endrey | 260—78 |
| 3,073,785 | 1/63 | Angelo | 260—78 |

WILLIAM H. SHORT, *Primary Examiner.*

J. R. LIBERMAN, *Examiner.*

UNITED STATES PATENT OFFICE
CERTIFICATE OF CORRECTION

Patent No. 3,179,634 April 20, 1965

Walter Murray Edwards

It is hereby certified that error appears in the above numbered patent requiring correction and that the said Letters Patent should read as corrected below.

Column 20, line 62, for "polyamide" read -- polyimide --; column 21, line 44, strike out "of a film"; column 22, lines 55 to 59, the second formula should appear as shown below instead of as in the patent:

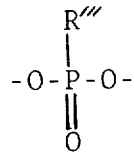

Signed and sealed this 14th day of September 1965.

(SEAL)
Attest:

ERNEST W. SWIDER
Attesting Officer

EDWARD J. BRENNER
Commissioner of Patents